(No Model.)

G. W. MEIGS.
EYE WIRE SUPPORTING PLATE.

No. 579,762. Patented Mar. 30, 1897.

WITNESSES:

George W. Meigs, INVENTOR

BY Drake & Co.
ATTORNEYS.

UNITED STATES PATENT OFFICE.

GEORGE W. MEIGS, OF NEWARK, NEW JERSEY, ASSIGNOR TO THE SPENCER OPTICAL MANUFACTURING COMPANY, OF SAME PLACE.

EYE-WIRE-SUPPORTING PLATE.

SPECIFICATION forming part of Letters Patent No. 579,762, dated March 30, 1897.

Application filed July 23, 1896. Serial No. 600,185. (No model.)

*To all whom it may concern:*

Be it known that I, GEORGE W. MEIGS, a citizen of the United States, residing at Newark, in the county of Essex and State of New Jersey, have invented certain new and useful Improvements in Eye-Wire-Supporting Plates; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to provide a support for eye-wires for spectacles or eyeglasses adapted to hold the said wires in shape in the polishing or other processes employed in the course of manufacture, to secure in said eye-wires a more perfect form and finish, to facilitate and cheapen manufacture, and to secure other advantages and results, some of which may be referred to hereinafter in connection with the description of the working parts.

The invention consists in the eye-wire-supporting plate and in the arrangements and combinations of parts, all substantially as will be hereinafter set forth, and finally embraced in the clauses of the claim.

Figure 1:
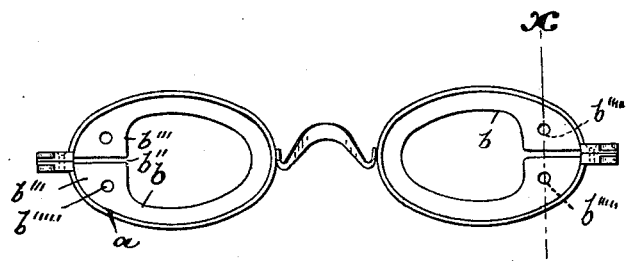
Figure 3:
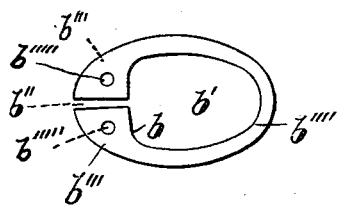
Figure 2:
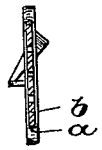

Referring to the accompanying drawings, in which like letters of reference indicate corresponding parts in each of the views, Figure 1 is a front elevation of a spectacle-frame, showing my improved plates in relative positions. Fig. 2 is a section of the same on line $x$. Fig. 3 is a detail plan of the improved eye-wire plate, and Fig. 4 illustrates a modification of construction.

In said drawings, $a$ indicates the eye-wire, and $b$ the supporting-plate. The latter consists of a resilient piece of sheet metal, preferably steel, which is ordinarily of elliptical form in general outline to conform to the correspondingly-shaped eye-wire. Said supporting-plate is convex or $\Lambda$-shaped at the edge in correspondence with the groove of the eye-wire to fit therein. The said plate is interiorly open, as at $b'$, and at one end is split or cut open, as at $b''$, so as to form the plate into a bow. The jaws or ends $b'''$ of said bow are adapted to be sprung together to admit of a ready insertion or withdrawal of the plate from the eye-wire without removing or loosening the screws of the latter. Said jaws are of considerable width in plan and preferably are perforated, as at $b''''$, so as to form in each jaw a bearing to receive the jaws of a tool acting somewhat as pliers and adapted to force the jaws $b'''$ together to reduce the circumference of the plate. The normal tendency, however, of said jaws is to lie spread apart, as shown in Fig. 3, so that the outer edge of the plate will press outward against the inner sides of the eye-wire and thus remain in position therein and at the same time force the wire outward, so that when the latter is being polished or otherwise manipulated it will be under considerable tension and be prevented from buckling, bending, or being thrown out of a proper, smooth, and regular shape.

Opposite the opening between the jaws the plate is of reduced thickness, as at $b''''$, so that it may be sprung with sufficient ease when the nipper-like tool is applied.

Figure 4:
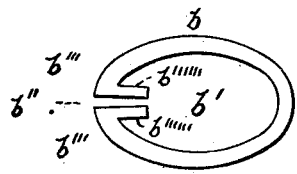

Instead of perforating the plate to form the bearings for the pliers I may form the jaws $b'''$ as in Fig. 4, where said jaws are given an inward turn, the hooked extremities thus formed providing the plier-bearings $b'''''$.

Other variations may be made without departing from the spirit or scope of the invention.

Having thus described the invention, what I claim as new is—

1. The improved eye-wire plate for use in manufacturing spectacles, eyeglasses, &c., which comprises a resilient flat sheet-metal piece of a thickness equal to or less than the width of the eye-wire and having jaws $b'''$, normally separate and independent from one another at their free ends, the center of the said plate being cut away to admit of said jaws being sprung together, substantially as and for the purposes set forth.

2. The improved eye-wire plate for use in manufacturing spectacles, eyeglasses, &c., which comprises a resilient and flat sheet-metal piece having perforated jaws $b'''$, normally separate and free from one another at their ends, the center of the said plate being cut away to admit of said perforated jaws being sprung together, substantially as and for the purposes set forth.

3. The improved eye-wire plate, which comprises a flat and resilient sheet-metal piece having normally open and free jaws provided with bearings to receive pliers by which said jaws may be pressed together or closed, substantially as and for the purposes set forth.

4. As an article of manufacture, an eye-wire plate or form comprising a flat sheet-metal piece having normally open and free jaws, and centrally open to admit of said jaws being drawn toward one another by pliers, the peripheral edges of said plate being convex or shaped to enter and be held in the interior eye-wire groove, substantially as set forth.

In testimony that I claim the foregoing I have hereunto set my hand this 17th day of July, 1896.

GEO. W. MEIGS.

Witnesses:
    CHARLES H. PELL,
    C. B. PITNEY.